No. 644,909. Patented Mar. 6, 1900.
H. C. HALL.
AMBULANCE.
(Application filed Aug. 8, 1899.)
(No Model.)

Witnesses:
John Enders, jr.
Ralph S. Warfield.

Inventor:
Harry C. Hall.
by Ahesa G. F. Bois & Co.
his Attorneys.

UNITED STATES PATENT OFFICE.

HARRY C. HALL, OF TELLURIDE, COLORADO.

AMBULANCE.

SPECIFICATION forming part of Letters Patent No. 644,909, dated March 6, 1900.

Application filed August 8, 1899. Serial No. 726,543. (No model.)

*To all whom it may concern:*

Be it known that I, HARRY C. HALL, a citizen of the United States of America, residing at Telluride, in the county of San Miguel and State of Colorado, have invented certain new and useful Improvements in Ambulances, of which the following is a specification.

My invention relates to an improvement in two-wheeled ambulances, one object being more especially to provide a light vehicle for conveying sick or injured people to a place of safety or for treatment.

A further object is to provide means for keeping the person carried in an approximately-horizontal position and to prevent sudden jars as far as possible.

With the foregoing objects in view the invention consists, in the main, in a frame, an axle, wheels, and a stretcher suspended from the frame in such a manner that the jars incident to traveling over rough and rutty places will be absorbed and the stretcher maintained in an approximately-horizontal position, notwithstanding any slight tilting or rocking of the ambulance.

My invention further consists in a frame having one end bent downwardly and the other upwardly to render it convenient for the attendants to operate it on a steep incline.

It further consists of a frame of the character specified mounted upon suitable wheels and provided with a brake to control the descent upon the side of a hill or slope.

The invention still further consists in certain details of construction and combinations of parts, which will be hereinafter more fully described, and particularly pointed out in the claims.

Figure 1:
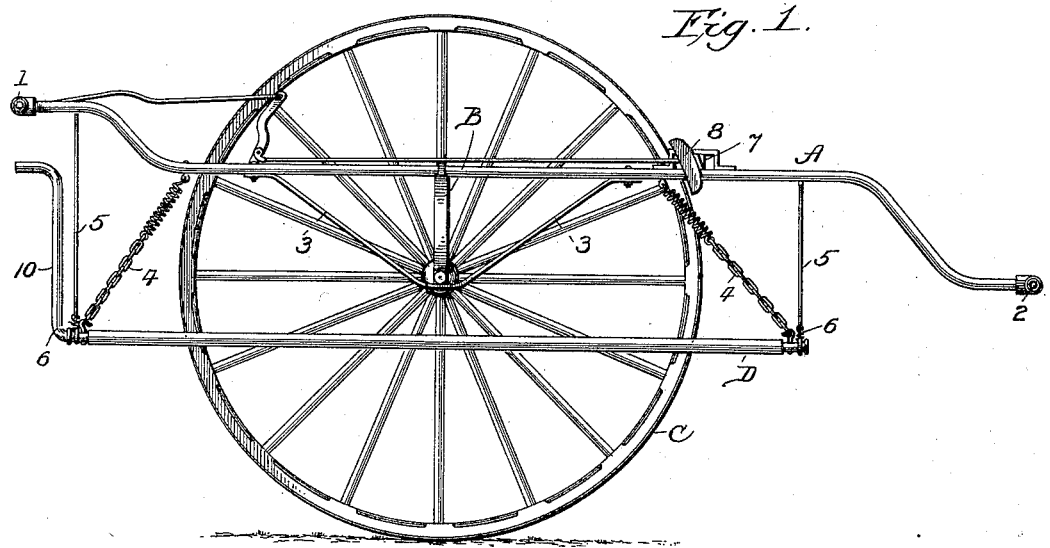
Figure 2:
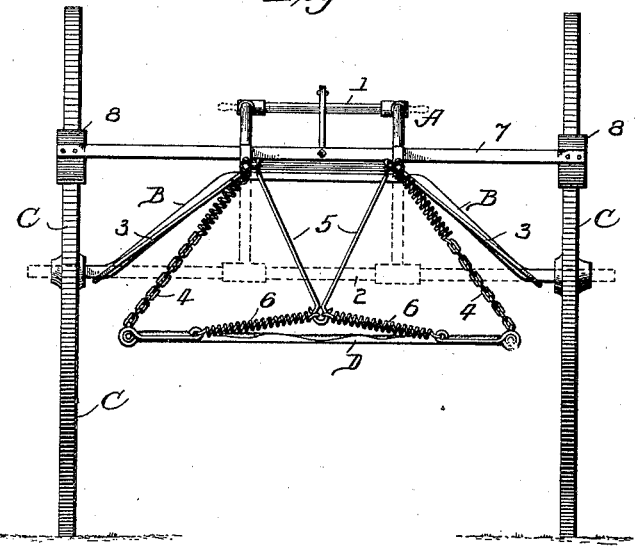
Figure 3:

In the accompanying drawings, Figure 1 is a view in side elevation with one of the wheels removed, and Fig. 2 is view in rear elevation.

A represents the main frame of the vehicle, this frame being composed of tubing and its dimensions being subject to variation in accordance with the size of the vehicle and the requirements. At the rear end the frame extends upwardly, as indicated, and at the forward end downwardly, the cross-bars 1 and 2 affording handles for the attendants in moving the vehicle, the object of this form being to render it easy to keep the frame in a substantially-horizontal position when descending the side of a hill or slope. At each corner of this frame is to be attached a suitable handle, arranged so that they may slide into the tubing or other substance of which the frame may be constructed to be out of the way when traveling or drawn out when in use.

B indicates the axle. This is arched upward in the center to be out of the way and to afford space for the person carried upon the ambulance.

C C are the wheels, in which the ends of the axle are supported, and the axle and frame are held rigidly in their proper relations with respect to each other by the braces 3 3, extending forward and rearward from the axle to the frame.

D represents the stretcher, it being composed of a framework of metal, tubing, or other suitable material rectangular in form and with suitable dimensions to accommodate the average-sized person. This stretcher is supported in position upon the ambulance by means of four hangers 4 4, which extend upwardly from the corners of the stretcher to the frame, where they are secured, said hangers inclining inwardly toward both the longitudinal and transverse center of the frame. They are preferably composed partly of chains and partly of moderately-stiff spiral springs, as indicated, and they are hooked at their lower ends to the stretcher, so that the latter may be quickly removed from the vehicle when occasion may require it. The object of disposing the hangers in this slanting position is that it maintains the stretcher in a level position when the wheel gets into a rut or is for any reason lower than the other or when the ground is very irregular and the person propelling the vehicle is in a higher or lower position than the structure. Furthermore, the object of the elastic hangers is that they absorb the jarring and jolting incident to travel over rough places, or, for that matter, travel even upon smooth ground, which always causes more or less jar and disturbance to a person suffering from illness or a wound. A still further object of this arrangement of the hangers is that it aids in preventing lateral or endwise swinging of the stretcher, which would not be the case were they suspended in a vertical position.

As a further means for preventing undue lateral vibration the stay-arms 5 5 depend from the front and rear ends of the frame, and spiral springs 6 6 extend from the lower ends of these arms outwardly to the stretcher. These stay-arms are pivotally attached to the frame in such a manner as to permit them to swing backward and forward with the stretcher, their function being, as previously stated, to prevent too much side or lateral motion.

A brake 7 has sliding or pivotal connection with the frame, as indicated, its shoes 8 8 being in position to rub against the forward edges of the wheels when the brake is applied. A handle 9 at the rear end controls the brake, and means is provided for locking it in a set position.

A gooseneck 10 projects upwardly from one end, preferably the rear end, of the stretcher, to be held by one of the attendants when the stretcher is being drawn over exceptionally-rough surfaces, so that the stretcher can be steadied in that way to a considerable extent.

From the foregoing it will be seen that a light and simple vehicle is provided which is most effectual in taking off the jar and preventing swinging of the stretcher and causing the latter to retain its level position, even when the vehicle itself tilts more or less.

Of course it is understood that the various parts of the ambulance may be varied in the details of construction, and the material employed and the dimensions of the various parts are wholly matters of choice. It might also be mentioned that the vehicle can be arranged to carry two stretchers, one above the other, and might be adapted for a draft-animal as well as to be held by a person without departing from the spirit and scope of my invention, and hence I do not wish to limit myself to the exact construction herein set forth, and it is also intended that instead of having the suspensory spirals springs may be placed on top of the framework in a fixed manner, operating in an opposite direction to that above mentioned, or, in other words, a spiral or spring that operates by contracting instead of expanding.

Having thus described my invention, what I claim as new, and desire to secure by Letters Patent, is—

1. In an ambulance, the combination with a frame, of a stretcher suspended therefrom by elastic hangers which extend from the stretcher upon an incline toward both the longitudinal and transverse center of the frame.

2. The combination with a frame extending upward at one end and downward at the other, of a stretcher suspended therefrom upon elastic hangers which slope toward the longitudinal and transverse center of the frame.

3. The combination with a frame extending upward at one end and downward at the other end, of a stretcher suspended therefrom upon elastic hangers which slope toward the longitudinal and transverse center of the frame and depending stay-arms connected with the stretcher to prevent undue lateral motion of the latter.

4. The combination with a frame extending upward at one end and downward at the other end, of a stretcher suspended therefrom upon elastic hangers which slope toward the longitudinal and transverse center of the frame and stay-arms having pivotal connection with the frame whereby they are capable of swinging endwise and connected to the stretcher in such a manner as to prevent undue lateral motion thereof.

5. The combination with a frame extending upward at one end and downward at the other end, of a stretcher suspended therefrom upon elastic hangers which slope toward the longitudinal and transverse center of the frame and depending stay-arms pivoted to the frame to swing lengthwise thereof and elastic connections between the lower ends of these arms and the stretcher for preventing undue lateral motion of the latter.

6. The combination with a frame and axle inclined upward and wheels, of a stretcher and elastic hangers extending from the latter to the frame upon an incline toward the longitudinal and transverse center of the frame.

7. The combination with a frame and axle and wheels, of a stretcher and elastic hangers extending from the latter to the frame upon an incline toward the longitudinal and transverse center of the frame and a gooseneck connected with the stretcher by which the latter may be steadied.

8. The combination with a frame and axle and wheels said frame extending upward at one end and downwardly at the opposite end, of a stretcher yieldingly suspended from the frame.

HARRY C. HALL.

In presence of—
W. L. McCALL,
L. C. KINIKIN.